(12) United States Patent
Jones (10) Patent No.: US 6,767,159 B2
(45) Date of Patent: Jul. 27, 2004

(54) OVERLAPPING CONNECTOR FOR AN EDGE RESTRAINT

(76) Inventor: Stephen Jones, 10800 Morris Ave. South, Bloomington, MN (US) 55437

(*) Notice: Subject to any disclaimer, the term of this patent is extended or adjusted under 35 U.S.C. 154(b) by 0 days.

(21) Appl. No.: 10/158,381

(22) Filed: May 29, 2002

(65) Prior Publication Data

US 2002/0141819 A1 Oct. 3, 2002

Related U.S. Application Data

(62) Division of application No. 09/075,259, filed on May 11, 1998, now Pat. No. 6,409,421.

(51) Int. Cl.[7] .................................................. A01G 1/08
(52) U.S. Cl. .................................. 404/7; 52/102; 47/33
(58) Field of Search .......................... 404/7, 8; 52/102, 52/582.5; 47/33

(56) References Cited

U.S. PATENT DOCUMENTS

| | | | |
|---|---|---|---|
| 3,916,563 A | 11/1975 | Tedesh | |
| 4,863,307 A | * 9/1989 | Jones | ............................. 404/7 |
| 4,897,973 A | * 2/1990 | Foster et al. | ................... 52/102 |
| 4,969,289 A | 11/1990 | Triffiletti | |
| 5,073,061 A | 12/1991 | Jones | |
| 5,092,076 A | 3/1992 | Terreta | |
| 5,168,678 A | 12/1992 | Scott, Jr. et al. | |
| 5,240,343 A | 8/1993 | Strobl, Jr. | |
| 5,259,154 A | 11/1993 | Lilley | |
| 5,375,941 A | * 12/1994 | Strobl, Jr. | ...................... 404/7 |
| 5,666,682 A | 9/1997 | Bonaddio et al. | |
| 5,720,128 A | 2/1998 | Smith et al. | |
| 5,729,937 A | 3/1998 | Mantelli | |
| 5,769,562 A | 6/1998 | Jones | |
| 5,806,249 A | 9/1998 | Helms | |
| 6,030,144 A | * 2/2000 | Cannella | ........................ 404/7 |

* cited by examiner

*Primary Examiner*—Thomas B. Will
*Assistant Examiner*—Raymond W Addie
(74) *Attorney, Agent, or Firm*—Altera Law Group, LLC (57) ABSTRACT

An overlapping or nesting connector is provided for connecting adjacent edge restraint sections. The edge restraint includes a substantially upright section and a base section, and may include braces extending between the upright section and the base section. The connector may be formed integrally with or separate from the edge restraint sections, and includes at least an upper wall, and optionally lateral walls and/or a rear wall. The upper wall may define an opening for a spike, and the brace or coupling structure with which the connector overlaps may define a corresponding opening for receiving the spike, which openings are aligned when the connector overlaps the brace. After adjacent edge restraints have been connected via the overlapping connector/brace, the spike is driven through the aligned openings into the underlying surface to provide a strong connection between the adjacent edge restraints and between the edge restraints and the underlying surface.

11 Claims, 12 Drawing Sheets

OVERLAPPING CONNECTOR FOR AN EDGE RESTRAINT

CROSS-REFERENCE

This application is a division of application Ser. No. 09/075,259, filed May 11, 1998, now U.S. Pat. No. 6,409,421 which is incorporated herein by reference in its entirety.

BACKGROUND

The present invention is directed to an edge restraint for restraining hard surfaces and structures such as paving stones in a predetermined boundary, and more particularly to a connector for coupling edge restraint sections, which connector may be integral with, or separate from, the edge restraint sections.

Edge restraints for restraining hard structures, such as landscape, pavement, wall or erosion control structures, are known. One such edge restraint for pavement is described in detail in U.S. Pat. No. Re. 33,550. Another edge restraint having variable height and width dimensions is known from U.S. patent application Ser. No. 08/780,702 by the instant inventor. Other edge restraints are disclosed in U.S. Pat. Nos. 5,240,343 and 5,375,941.

Edge restraints are typically manufactured and sold in uniform-length sections, for example 4, 6, 7, 8, 10 or 12 foot long sections. Although the known edge restraints may be made in different sizes, it is costly to manufacture, as well as to inventory, custom sizes. Therefore, in order to restrain a hard structure having a length which exceeds the uniform-length section, a plurality of the sections are arranged end-to-end to provide an edge restraint having the desired length. When forming an edge restraint out of multiple sections in this manner, it is often advantageous to connect adjacent edge restraint sections together, in order to facilitate proper alignment, in order to reduce assembly times, and in order to provide a sturdier restraint in which forces can be transferred between the adjacent sections.

For connection of adjacent sections, U.S. Pat. No. Re. 33,550 utilizes a connecting cylinder which is pushed into an interior area of each of two adjacent edge restraints for frictional coupling thereto. However, this requires a separate connector piece, and requires substantial assembly efforts to insert the connecting cylinder into each of the adjacent edge restraints.

For connection of adjacent sections, U.S. Pat. Nos. 5,240,343 and 5,375,941 provide a male member 130 on a tab end 128 of one edge restraint section 100, which male member 130 cooperates with the female member 132 on the receiving end 134 of an adjacent edge restraint section 100. The capping strip 144 may additionally have a snap mechanism 150 having a male snap 152 and female snap 154 across the capping strip 144. However, the snap-type connectors of U.S. Pat. Nos. 5,240,343 and 5,375,941 have the following disadvantages. The male member 130 is inherently relatively fragile since it is made of plastic and has a relatively small cross-section in connection with the tab end 138, so it can only withstand relatively small forces, particularly shear and torsional forces about the cross-section in connection with the tab end.

Accordingly, the male member 130 may be easily damaged or broken off during attempted assembly, either during insertion thereof into the female member 132 of an adjacent edge restraint section 100, or when driving nails into the braces 162. Likewise, the male member 130 may be damaged or broken off during shipment and handling, or by forces on the edge restraint after installation, for example shifting of the hard surface being restrained and/or the underlying base surface.

Furthermore, the snap-type connections of U.S. Pat. Nos. 5,240,343 and 5,375,941 do not provide as strong of a connection between adjacent edge restraint sections as is desirable. Furthermore, the location of the snap-type connections of U.S. Pat. Nos. 5,240,343 and 5,375,941 may make assembly difficult, requiring precise alignment of the male member 130 with the female member 132, as well as a longitudinal relative movement to slide the male member 130 of one edge restraint section 100 into the female member 132 of an adjacent section 100. Such alignment and connection may be particularly cumbersome when there is any irregularity in the surface on which the restraint is installed.

Therefore, there is a need for an edge restraint having a more rugged connection for connecting adjacent sections than the prior art edge restraints, and which can be assembled more easily than the prior art edge restraints.

These and other needs have been met according to the instant invention by providing a connector for connecting two edge restraint sections, said connector comprising at least one wall to be overlapped with a corresponding connecting structure of at least one of said two edge restraint sections.

These and other needs have also been met according to the instant invention by providing an edge restraint section, comprising: a substantially upright section; a base section extending from a lower end of said upright section; and a connector located at a longitudinal end of said upright and base sections, said connector configured to overlap with one of the braces of another one of the edge restraints.

These and other needs have also been met according to the instant invention by providing a mold for manufacturing an edge restraint, said mold including at least one mold piece defining spaces comprising: a substantially upright section; a base section extending from a lower end of said upright section; and a connector located at a longitudinal end of said upright and base sections, said connector configured to overlap with one of the braces of another one of the edge restraints.

These and other needs have also been met according to the instant invention by providing an edge restraint section, comprising: a substantially upright section; a base section extending from a lower end of said upright section; and at least one cutting guide formed in said upright section.

These and other needs have also been met according to the instant invention by providing an edge restraint section, comprising: a substantially upright section; a base section extending from a lower end of said upright section; and at least one cutting guide formed in said base section.

Other objects, advantages and novel features of the present invention will become apparent from the following detailed description of the invention when considered in conjunction with the accompanying drawings.

DETAILED DESCRIPTION OF THE DRAWINGS

Figure 7:
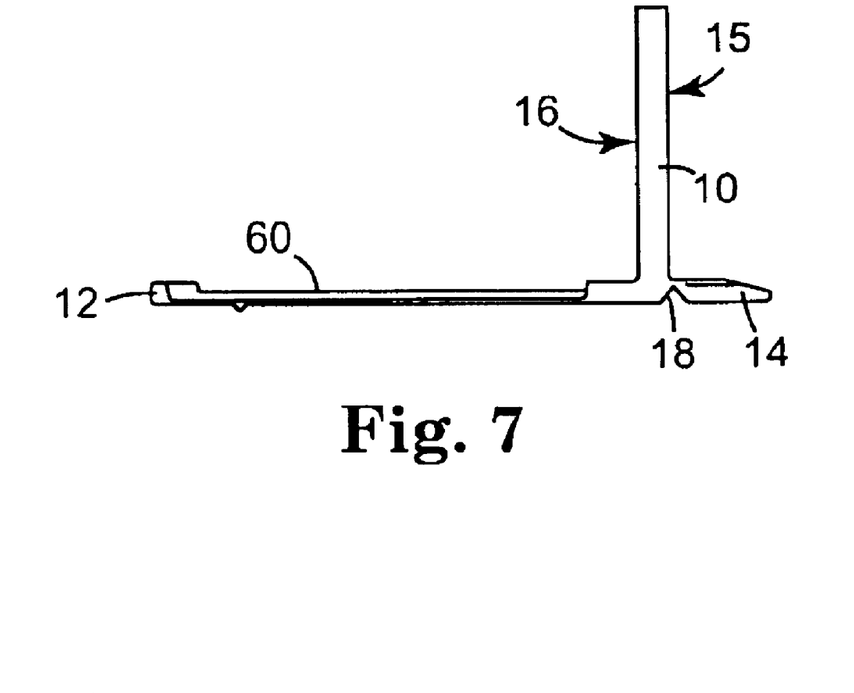
FIG. 7 is a sectional view along line 7—7 of FIG. 3.
Figure 8:
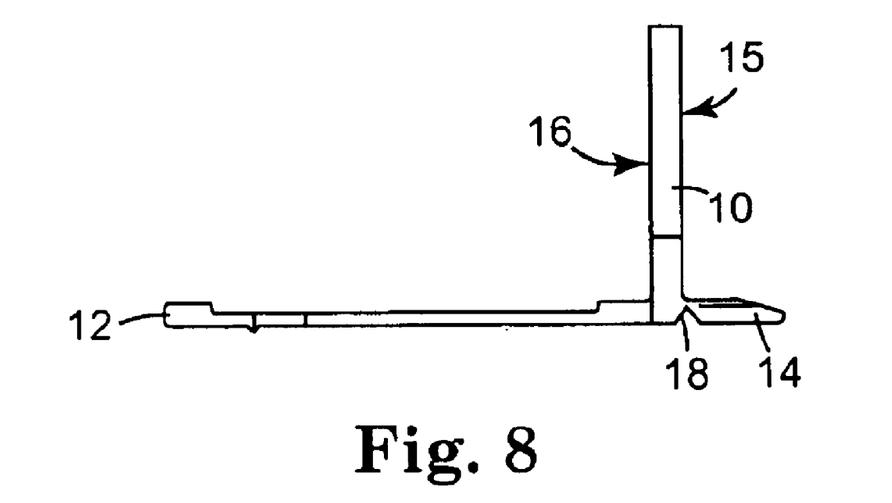
FIG. 8 is a sectional view along line 8—8 of FIG. 3.
Figure 9:
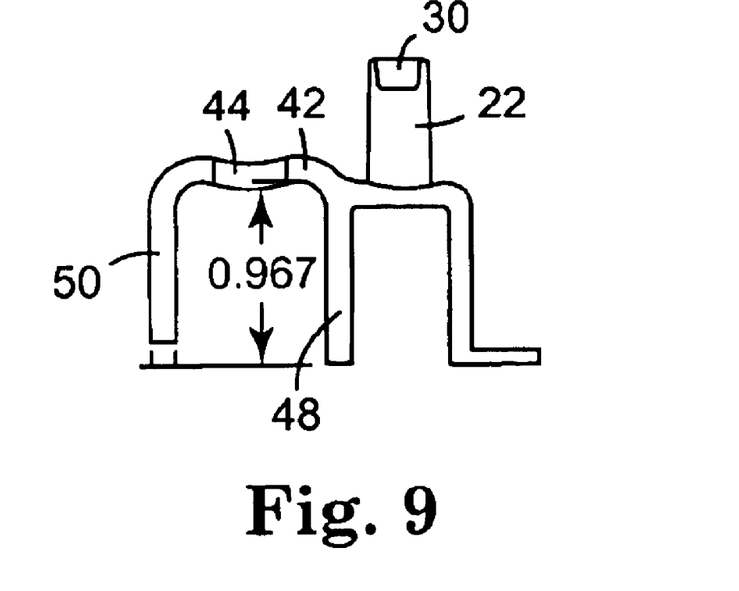
FIG. 9 is a sectional view along line 9—9 of FIG. 3.

Referring to FIGS. 1–4, the edge restraint includes a substantially upright section 10 and a base section 12. The upright section 10 and the base section 12 are in the form of walls or strips. The edge restraint includes a lip 14 which extends on the front side 15 of the upright section 10 (i.e. the side facing the paving stone or hard surface to be restrained—see FIG. 7) and the base section 12 which extends on the rear side 16 of the upright section 10 (i.e. the side facing away from the hard surface to be restrained). The entire edge restraint may be molded in one piece from a plastic, aluminum, or any other flexible yet strong material, such as by injection molding.

The lip 14 is formed with an indentation 18 or score line. In certain situations, the lip 14 is removed prior to installation, for example when restraining an existing hard surface where the lip 14 cannot be positioned underneath the hard surface. The indentation 18 aids in such removal by allowing the lip 14 to be removed by tearing, bending and breaking, cutting, or the like, and can easily be accomplished manually at the installation site without special tools. The indentation has a V-shaped cross-section to promote a clean break at the vertex of the V, which is aligned with the upright section 10. Of course, the indentation may be U-shaped, or have any other configuration. The indentation 18 preferably extends completely through the lip 14 to define an opening 19 at one or both longitudinal ends, to facilitate removal of the lip 14. Furthermore, the lip 14 may be thinner at the longitudinal ⁻nds, to allow it to be bent more easily for removal thereof. After a portion of the lip 14 has been separated, the separated portion can be grasped more easily and it becomes easier to remove the rest of the lip.

Figure 10:
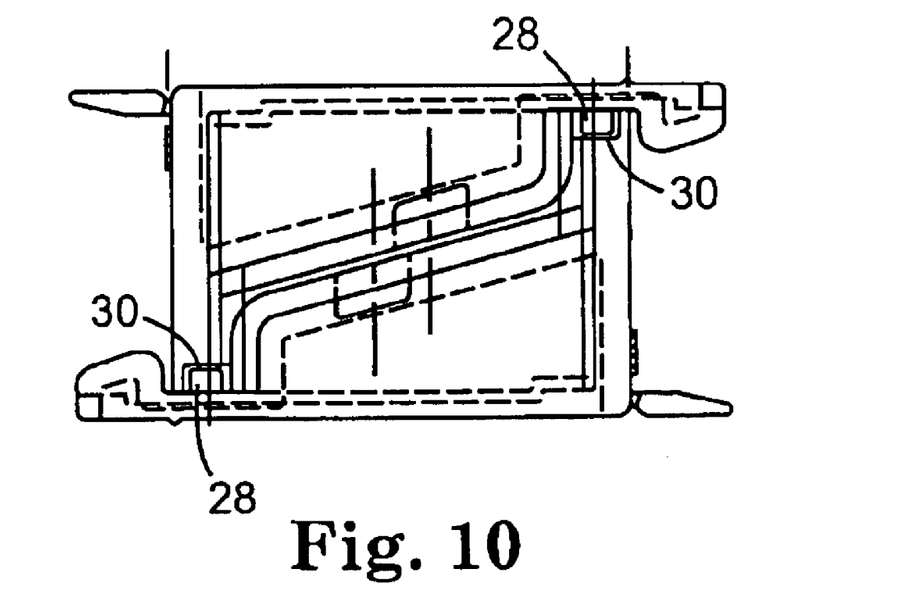
FIG. 10 is an end view of two edge restraint sections stacked together.

A plurality of braces 20A, 20B, 20C . . . 20N (see FIG. 4) are spaced over the longitudinal course of the edge restraint, preferably equidistantly. The braces 20 extend between the upright section 10 and the base section 12, and are hollow on the lower side (see FIG. 2). A columnar portion 22 is formed integrally with the upright section 10 on the rear side thereof, extending from the brace 20 to the upper edge 24 of the upright section 10. A portion 26 of each brace 20 is recessed and is provided with a connector 28. The connector 28 is configured to be engageable with a receiver 30 defined at an upper edge of the columnar portion 22, in order to allow the restraint sections to be stacked as shown in FIG. 10 for ease of storage and transportation.

The upper wall 32 of the brace 20 defines a brace opening 34 for receiving a pin-type connector (e.g., a nail, a stake, or a spike) to be driven therethrough to help hold the edge restraint in the underlying surface. A thin-walled portion 36 is provided in the brace opening 34, the thin-walled portion 36 defining an opening which is smaller than the diameter of the spike to be driven therethrough. The thin-walled portion 36 is elastically deformable such that the spike can be manually inserted therein in an intermediate installation position prior to driving the spike into the ground or other underlying base surface. The thin-walled portion 36 frictionally holds the spike in that intermediate position until it is driven into the underlying base surface, at which time the thin-walled portion elastically deforms to allow the spike to pass therethrough.

Figure 4:
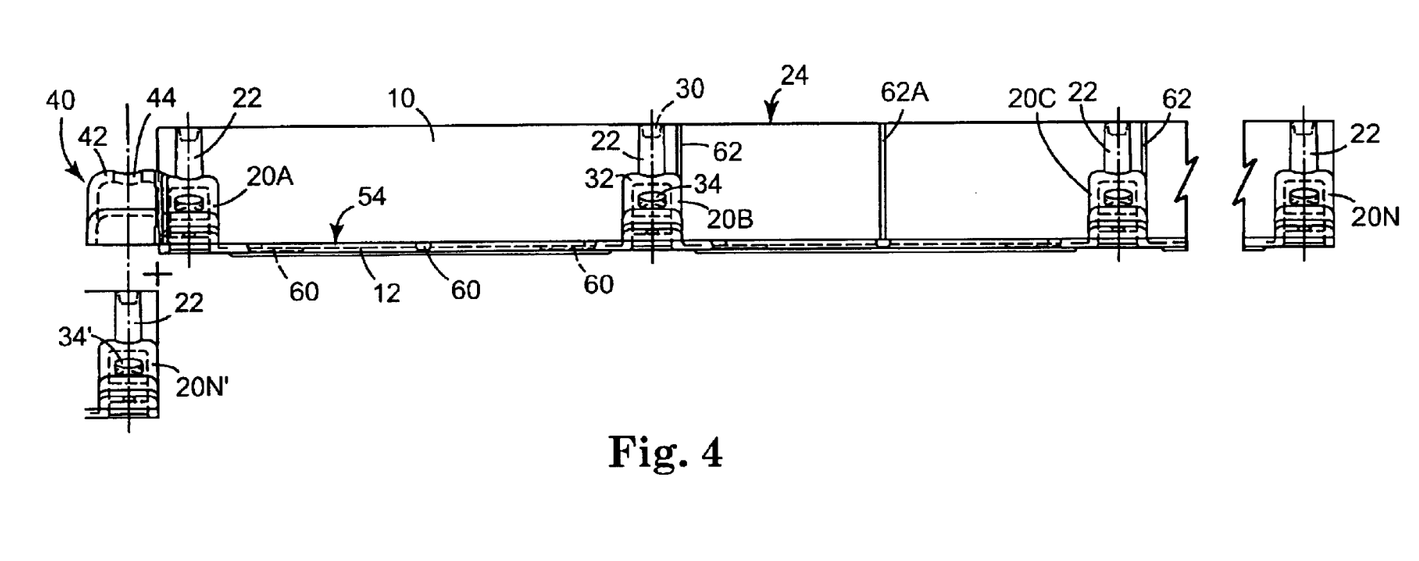
FIG. 4 is a rear view of the edge restraint section of FIG. 1.
Figure 5:
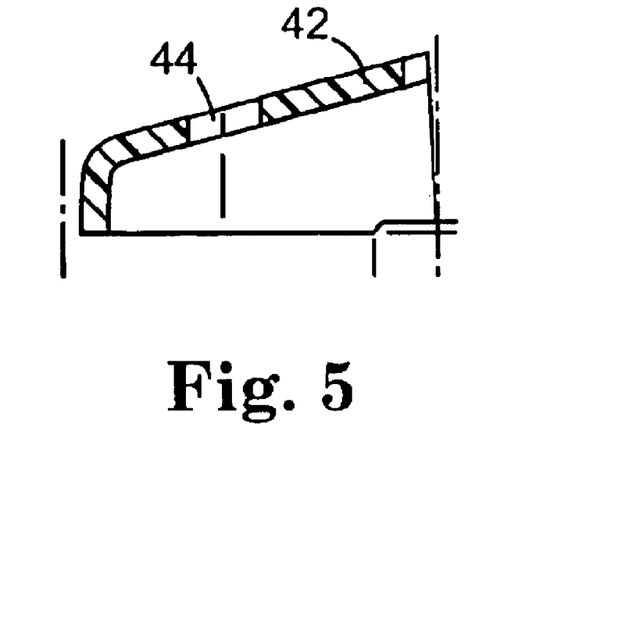
FIG. 5 is a sectional view along line 5—5 of FIG. 3.
Figure 6:
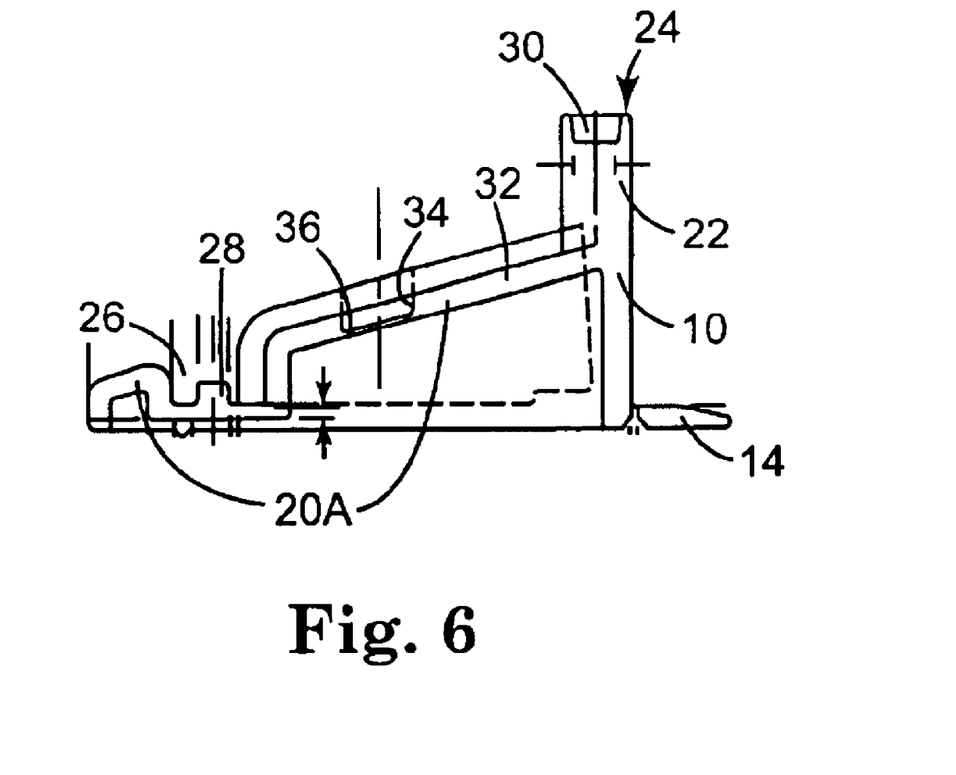
FIG. 6 is a sectional view along line 6—6 of FIG. 3.

A connector 40 is provided at one longitudinal end of the edge restraint, for engagement with a brace 20N' at the opposing longitudinal end of an adjacent edge restraint section (see FIG. 4). The connector 40 has an interior configuration which essentially corresponds to an exterior configuration of the brace 20, such that the connector can be fitted over the brace in an overlapping or nesting type of arrangement such that the base section 12 and the upright section 10 of the adjacent edge restraint sections are longitudinally aligned. An upper wall 42 of the connector 40 defines a connector opening 44 which aligns with the brace opening 34' in the brace 20N' with which the connector is engaged. These aligned openings 44, 34' receive a spike which is driven into the underlying base surface. The spike provides a stable connection between the adjacent edge restraint sections, and between the edge restraint sections and the underlying base surface. A front edge of the upper wall 42 defines a half-circle cut-out 46 to provide clearance for the columnar portion 22.

Figure 1:
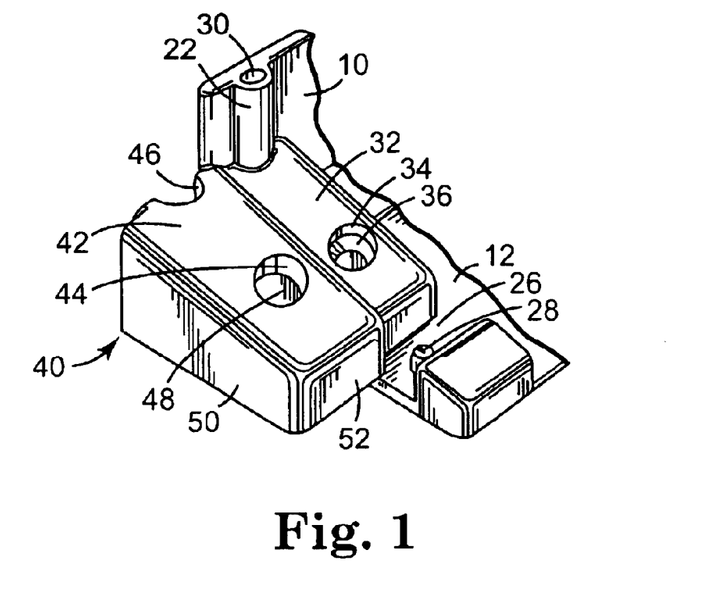
FIG. 1 is a perspective view of an edge restraint section having an overlapping connector formed integrally therewith according to a preferred embodiment of the present invention.
Figure 2:
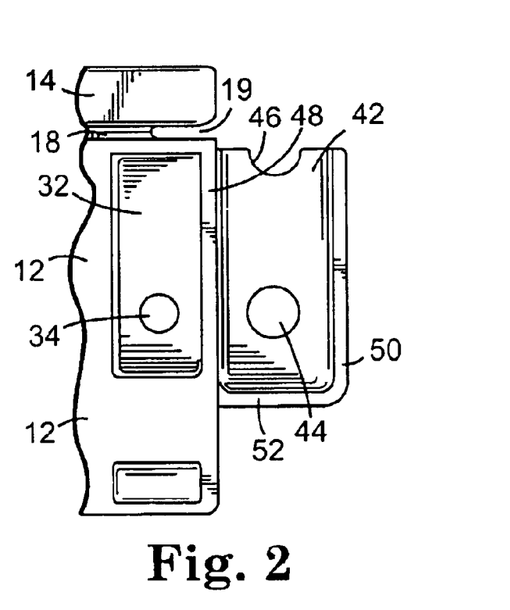
FIG. 2 is a bottom view of the edge restraint section of FIG. 1.

The connector 40 shown in the embodiment of FIGS. 1–10 includes the upper wall 42, an inner lateral wall 48 extending downward from an inner lateral edge of the upper wall, an outer lateral wall 50 extending downward from an outer lateral edge of the upper wall, and a rear wall 52 extending downward from a rear edge of the upper wall. Thus, the connector of FIG. 1–10 essentially surrounds the corresponding brace 20 to which it is engaged on four sides, i.e. top side, both lateral sides and rear side. The inner lateral wall may be integral with the outer wall of the brace, or it may be separate therefrom. In the embodiment of FIGS. 1–10, the inner lateral wall 48 of the connector 40 is the outer lateral wall of the brace 20A. The bottom edges of each of the inner lateral wall 48, the outer lateral wall 50, and the rear wall 52 end essentially at the plane defined by a top 54 of the base section 12, as seen in FIGS. 1 and 4, in order to provide appropriate clearance for proper alignment of the adjacent base sections of adjacent edge restraints when connected.

Figure 14:
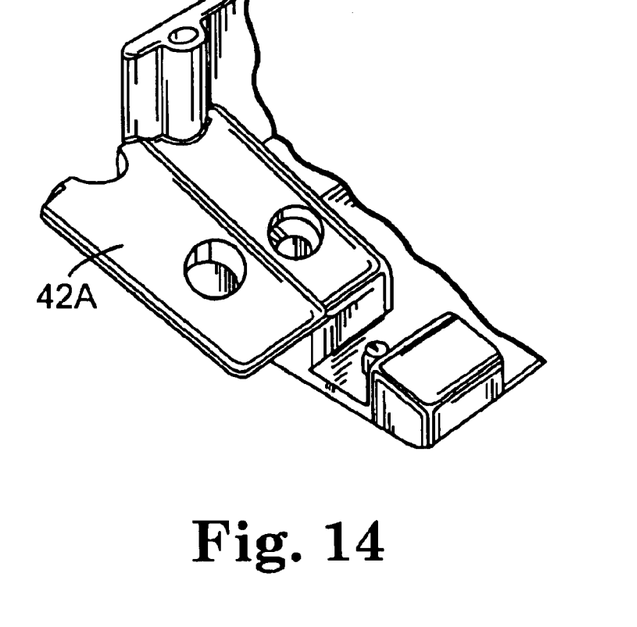
FIG. 14 is a perspective view of an overlapping connector according to another preferred embodiment of the present invention.
Figure 15:
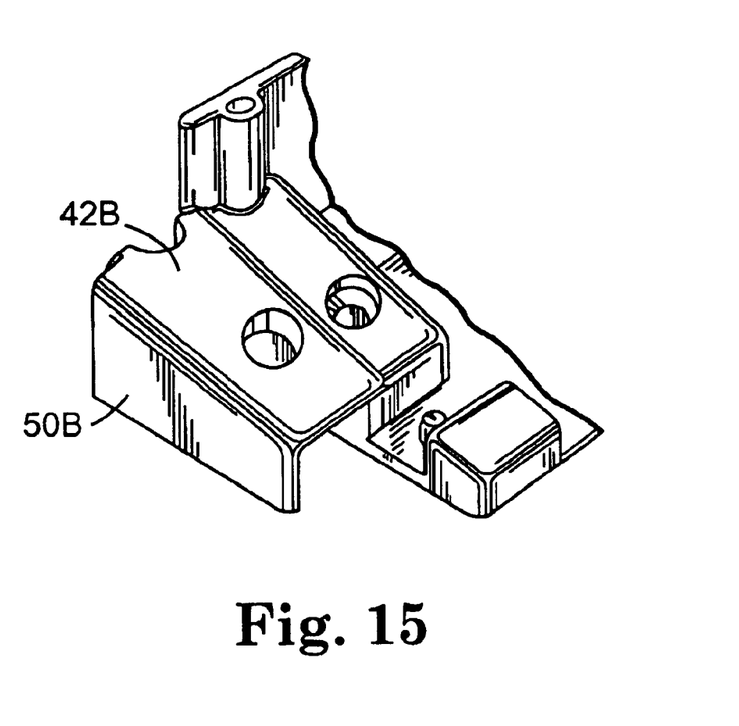
FIG. 15 is a perspective view of an overlapping connector according to another preferred embodiment of the present invention.
Figure 16:
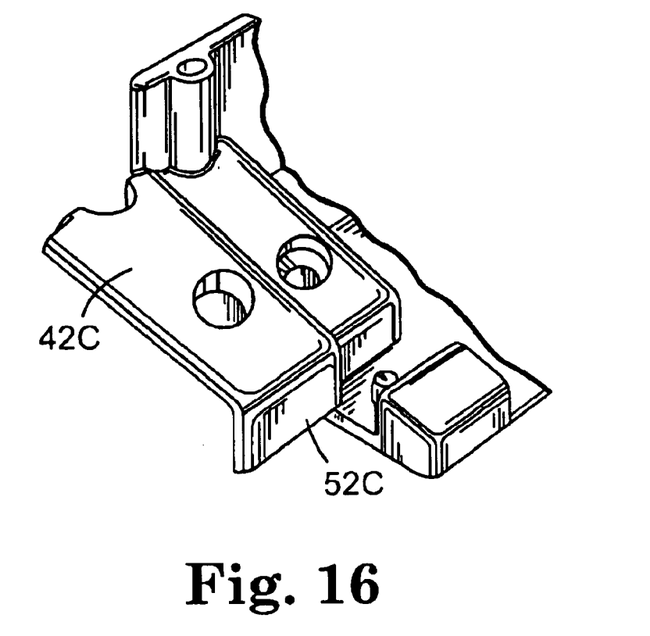
FIG. 16 is a perspective view of an overlapping connector according to another preferred embodiment of the present invention.

The four-walled connector provides the most secure connection. However, the instant invention also contemplates a connector which includes fewer than four walls. The primary portion of the connector is the upper wall, which provides the structure for overlapping connection to an adjacent edge restraint section. Therefore, the connector may consist of an upper wall 42A alone, as shown in FIG. 14. The connector may consist of an upper wall 42B and an outer lateral wall 50B, as shown in FIG. 15. The connector may consist of an upper wall 42C and a rear wall 52C, as shown in FIG. 16. Such alternative embodiments may be advantageous when edging a nonlinear surface. Of course, any number of alternative designs making use of the invention can be envisioned, provided the designs make use of the spike to secure adjacent edge restraint sections together in some form of overlapping connection.

Figure 17:
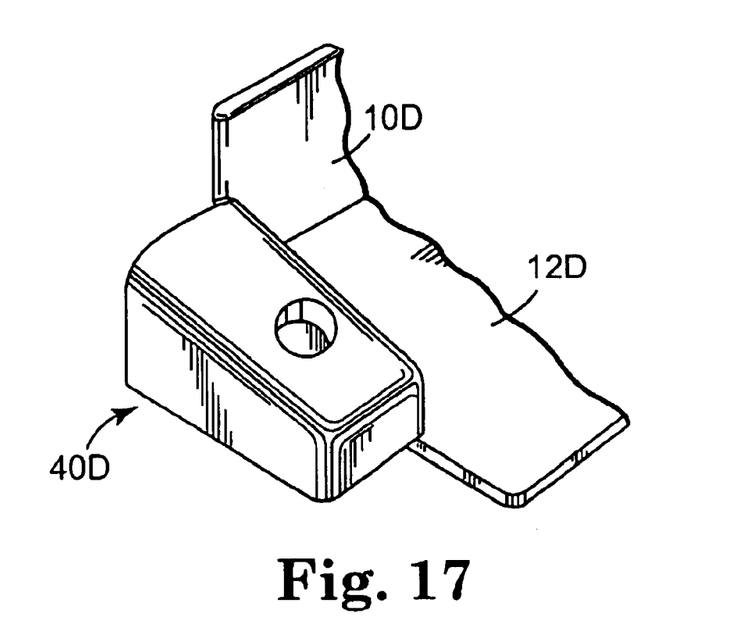
FIG. 17 is a perspective view of an overlapping connector according to another preferred embodiment of the present invention.

In the embodiment of FIGS. 1–10, the connector 40 adjoins the brace 20A. However, it is also contemplated to eliminate that brace and provide only a connector 40D at the end of the edge restraint section, attached to the upright section 10D and the base section 12D, as shown in FIG. 17.

Figure 3:
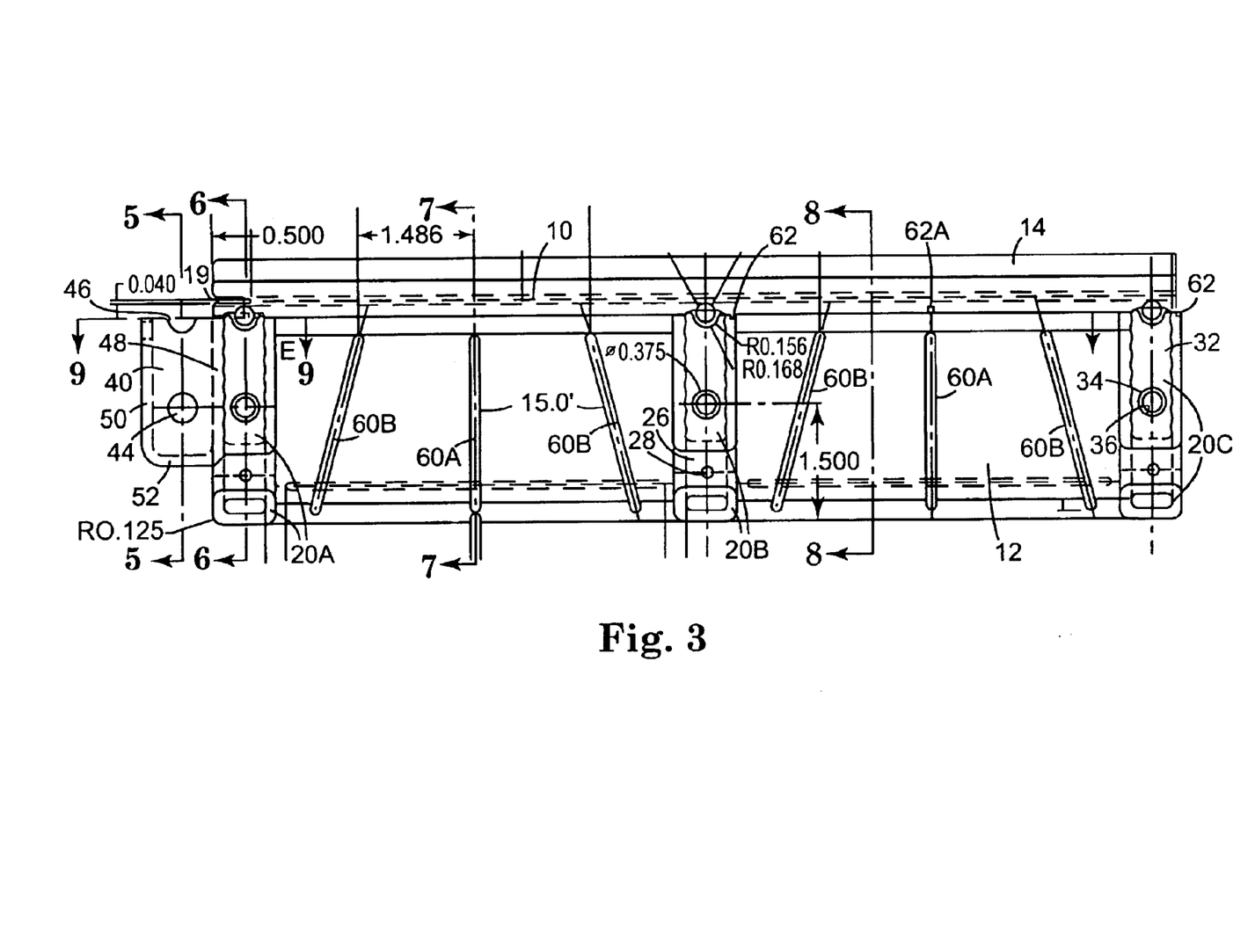
FIG. 3 is a top view of the edge restraint section of FIG. 1.

Cutting guides 60 are provided uniformly spaced along the base section 12 (see FIG. 3). When edging a non-linear surface, the base section 12 should be cut to allow the upright section 10 to follow the non-linear surface (of course, large radius bends could be accomplished without cutting due to the elasticity of the materials). The cutting guides 60 advantageously provide guidance for a straight, smooth cut. The uniform spacing permits the edging to bend in a uniform curve (if the base section is not cut at equal spacing, the curve will not be uniform). In the embodiment of FIGS. 1–10, the cutting guides are recesses or channels in the base section 12, which not only provide visual guidance, but also provide physical guidance for a cutting tool, which can cut more easily through the reduced thickness of the base sections at the recesses or channels. However, the cutting guides may alternatively be ribs or raised portions, score lines, marked lines, or any structure or visual representation that provides visual and/or physical guidance for cutting a straight line. These cutting guides on the base section are considered to be separately patentable independent of the other features of the present invention (for example, independent of the connector).

As shown in FIG. 3, one straight cutting guide 60A is arranged centrally between each adjacent set of braces, while two angled cutting guides 60B are arranged mirror symmetrically on each side of the straight cutting guide 60A. The straight cutting guides 60A are equidistantly spaced from each other over the length of the edge restraint. The ends of the angled cutting guides 60B adjacent the upright section 10 are equidistantly spaced over the length of the edge restraint. Typically, either the straight cutting guides 60A will be cut, for edging a surface with a gentle, gradual curve, or the angled cutting guides 60B will be cut, for edging a tighter radius curve. Additional cutting guides may be provided, if desired, and the angle of the angled cutting guides 60B may be varied.

Further cutting guides 62, 62A are provided along the upright section 10 (see FIG. 4). The cutting guides 62A are ribs or raised portions (see FIG. 3) located at the side of the braces 20 opposite the connector 40. Additional or alternative cutting guides may be provided, for example the cutting guide 62 is a recess in the upright section 10 (see FIG. 3). Since the edging typically comes in long sections (for example, four, six, seven, eight, ten or twelve foot sections, etc.), it must often be cut to size. These cutting guides 62 advantageously provide guidance for a straight, smooth cut, allowing an adjacent edging section to be tightly connected thereto (via connector 40 of the adjacent edging section). As with the cutting guides 60, the cutting guides 62 may alternatively be score lines, marked lines, or any structure or visual representation that provides visual and/or physical guidance for cutting a straight line. These cutting guides on the upright section are considered to be separately patentable independent of the other features of the present invention (for example, independent of the connector).

It is to be clearly understood that the present invention is not limited to the particular configurations of the connector, braces, base section, upright section, lip, or any other of the structure shown in the illustrated preferred embodiments.

Figure 12:
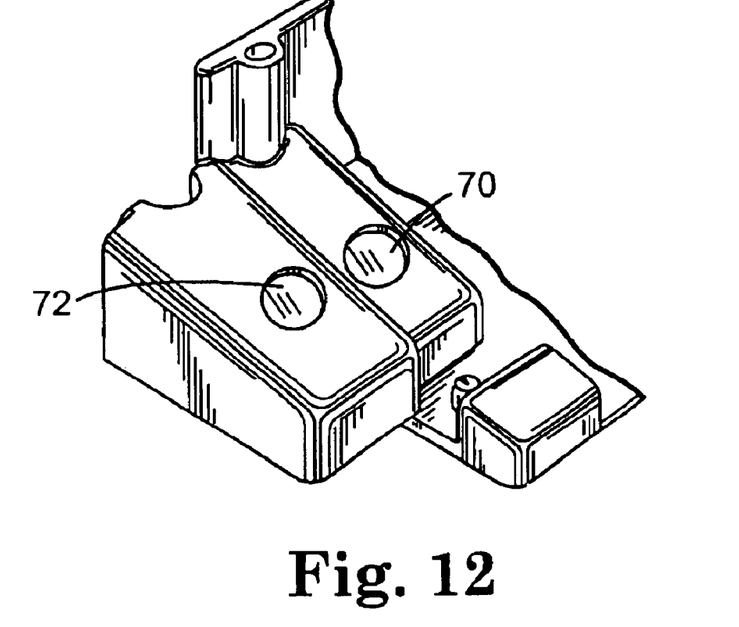
FIG. 12 is a perspective view of an overlapping connector according to another preferred embodiment of the present invention.
Figure 13:
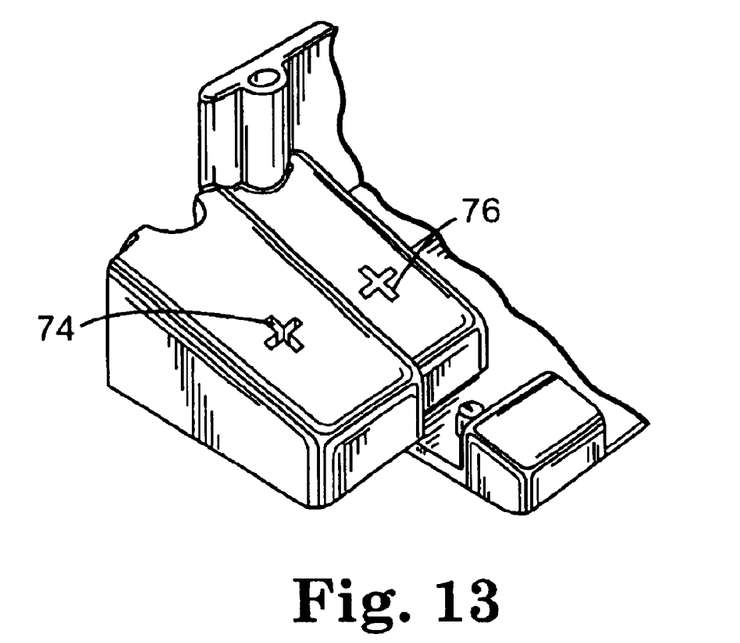
FIG. 13 is a perspective view of an overlapping connector according to another preferred embodiment of the present invention.

In the embodiment of FIGS. 1–10, the braces 20 and the connector 40 have openings for receiving a spike, nail, stake, or similar connector. Alternatively, it is contemplated to utilize a recess 70 and/or a recess 72 as shown in FIG. 12, in lieu of the brace opening 34 and/or the connector opening 44 of FIGS. 1–10. The material at the base of the recesses 70, 72 is preferably thin enough to allow the spike to be manually inserted therethrough, while being elastic to hold the spike in an intermediate installation position prior to being driven into the underlying support surface, in a manner similar to the thin-walled portion 36 described above. In a further alternative embodiment, it is contemplated to utilize score lines 74 or markings 76 as shown in FIG. 13, in lieu of the brace opening 34 and/or the connector opening 44 of FIGS. 1–10.

Figure 11:
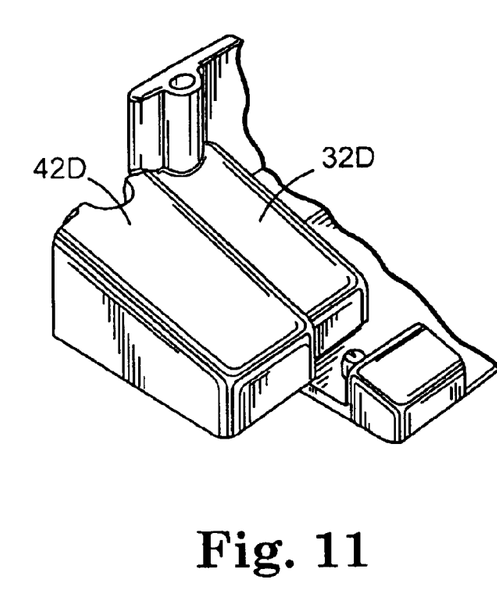
FIG. 11 is a perspective view of an overlapping connector according to is another preferred embodiment of the present invention.

According to a further contemplated embodiment shown in FIG. 11, it is to be clearly understood that no openings, recesses, score lines, or markings are necessary on the connector and/or the brace. A spike can be driven directly through the upper wall 32D of the brace and/or the upper wall 42D of the connector without any openings, recesses, score lines, or markings. Also, it is to be clearly understood that spikes may be driven through the base section 12 for additional or alternative connection to the underlying base structure.

In the illustrated preferred embodiments, the connector 40 is configured to be connected to a brace 20 of an adjacent edge restraint section. Alternatively, the adjacent edge restraint section may be provided with any corresponding connecting structure to be overlapped by and connected to the connector 40, whether or not such connecting structure performs a bracing function or acts as a brace between the upright and base sections.

Furthermore, it is to be clearly understood that the instant invention is not limited to the braces 20 shown in the illustrated preferred embodiments. One of ordinary skill in the art would recognize that various different supporting structure could be used between the upright section 10 and the base section 12. Furthermore, if the upright section and base section are designed to be rigid enough, the braces or supporting structure therebetween may be eliminated entirely, for example as shown in FIG. 17. In such a case, a coupling structure for overlapping engagement with the connector 40 is provided at the opposite longitudinal end of the edge restraint section.

Figure 18:
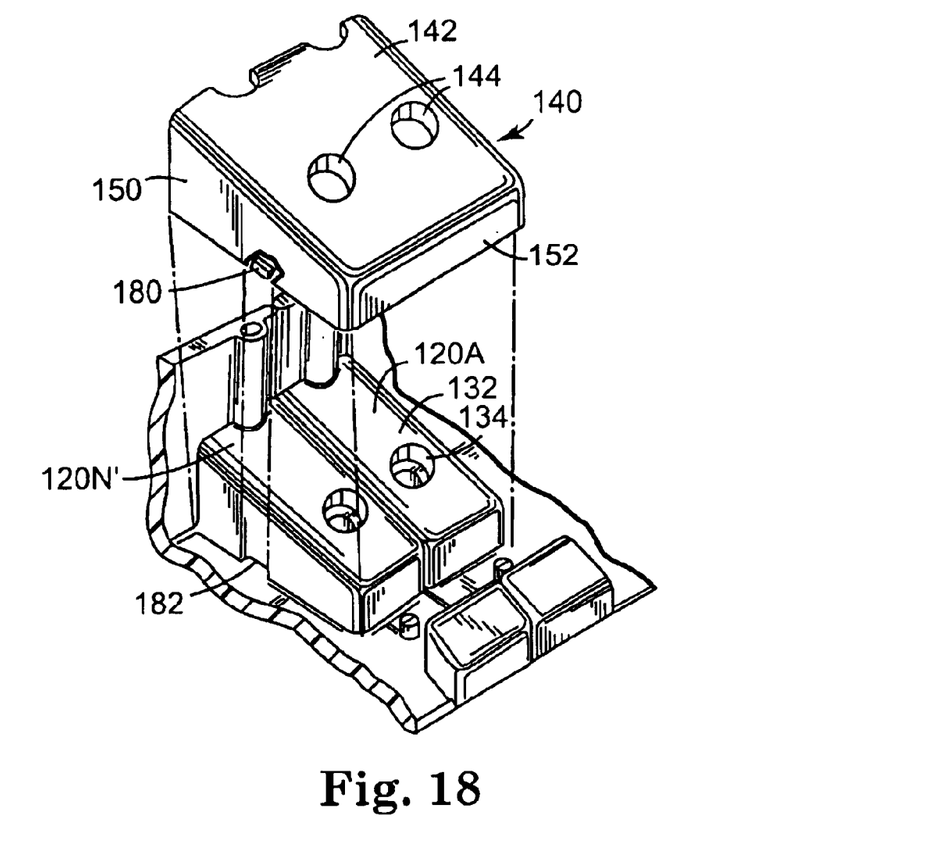
FIG. 18 is a perspective view of two adjacent edge restraint sections having an overlapping connector formed separately therefrom according to a preferred embodiment of the present invention.
Figure 19:
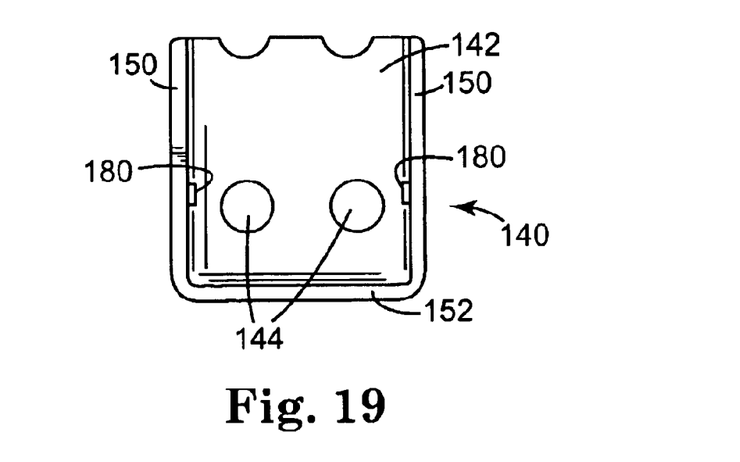
FIG. 19 is a bottom view of the overlapping connector of FIG. 18.
Figure 20:
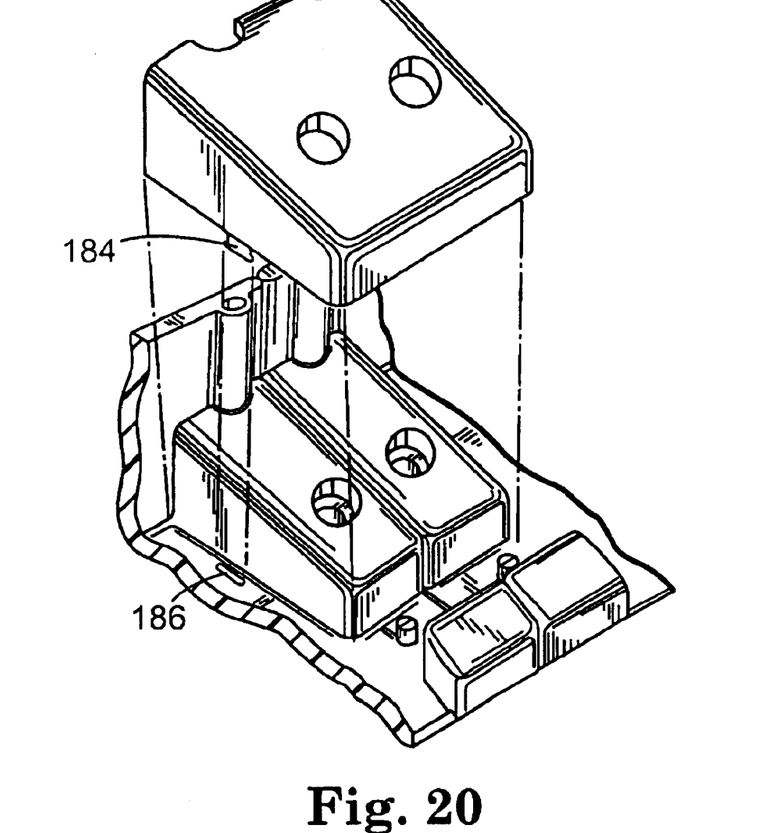
FIG. 20 is a perspective view of two adjacent edge restraint sections having an overlapping connector formed separately therefrom according to another preferred embodiment of the present invention.
Figure 21:
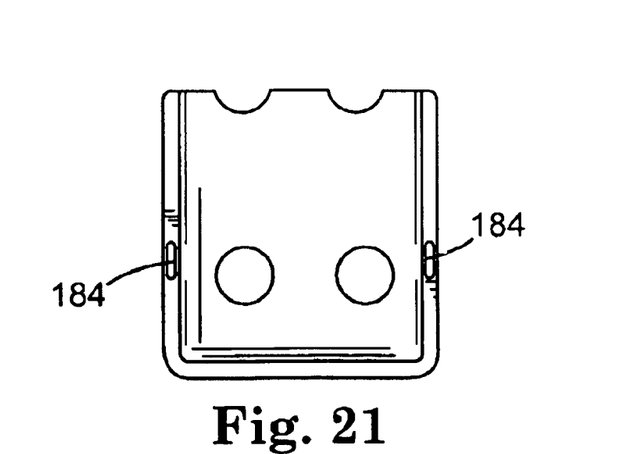
FIG. 21 is a bottom view of the overlapping connector of FIG. 20.

FIGS. 18–21 show alternative embodiments where an overlapping connector 140 is formed separately from the edge restraint sections. FIGS. 18 and 20 show two edge restraint sections longitudinally aligned for connection, with the brace 120A of one section arranged abutting the brace 120N' of the adjacent section. The connector 140 is formed as a separate piece to be placed over the braces 120A, 120N', as indicated by the dot-dash lines in FIGS. 18 and 20. Although the connector 140 shown in FIGS. 18–21 includes braces, it is contemplated to modify the structure thereof or eliminate them completely and provide a non-bracing structure for overlapping engagement by the connector 140, as discussed above.

The connector 140 includes an upper wall 142, lateral walls 150, and rear wall 152, which define a hollow space (see FIG. 19). An interior surface of the connector 140 essentially corresponds to an outer surface of the braces 120A, 120N'. Although the connector 140 shown in FIGS. 18–21 includes four walls, it is contemplated to modify the connector to omit at least one of the rear wall 152 and the lateral walls 150, in a manner similar to that of the connectors shown in FIGS. 14–16. It is also contemplated to provide an intermediate wall centrally between the lateral walls 150.

Openings 144 are defined in the upper wall 142 of the connector 140, which align with the openings 134 defined in the upper wall 132 of the braces 120A, 120N'. Alternatively, the openings 144 may be replaced by recesses, score lines, markings, or the upper walls 142, 132, or may be omitted altogether, as described above in reference to FIGS. 11–13.

Latching elements 180 are provided extending inwardly on the lateral walls 150, for frictional or locking engagement with recesses or openings 182 provided in side walls of the braces 120A, 120N', when the connector 140 is placed thereover.

In the alternative embodiment shown in FIG. 20, the latching elements 184 extend downwardly from the lateral walls 150, engaging a recess or opening 186 in the base section 112. It is contemplated to provide such latching elements 180, 184 on the connector 40 and such recesses or openings 182, 186 of the embodiments of FIGS. 1–17.

It is to be clearly understood that it is contemplated to modify the structure of the edge restraint sections and the separate connectors of the embodiments of FIGS. 18–21 to incorporate structure of the embodiments of FIGS. 1–17, it is also contemplated to modify the structure of the edge restraint sections and the connectors of the embodiments of FIGS. 1–17 to incorporate structure of the embodiments of FIGS. 18–21.

To assemble the edge restraint sections to form an edge restraint system for a hard surface, a plurality of the edge restraint sections are connected longitudinally together, with the connector 40 of each edge restraint section being placed over the brace 20N' (see FIG. 4) at the opposing end of an adjacent edge restraint section to form an overlapping or nesting engagement therebetween. The connector opening 44 (or recess, score line, marking, etc.) in the upper wall 42 of the connector 40 is aligned coaxially with the brace opening 34 (or recess, score line, marking, etc.) in the brace 20N' in this coupled position. A spike is driven through the aligned connector opening 40 and brace opening 34 into the underlying surface, advantageously providing a simple yet secure attachment joint between the adjacent edge restraints and between both of the edge restraints and the underlying surface. Accordingly, the instant invention provides a stable and secure connection between adjacent edge restraint sections which is rugged (i.e., is not easily damaged during transport or assembly) and further enables easy assembly of an edge restraint system consisting of a plurality of the edge restraint sections.

Figure 22:
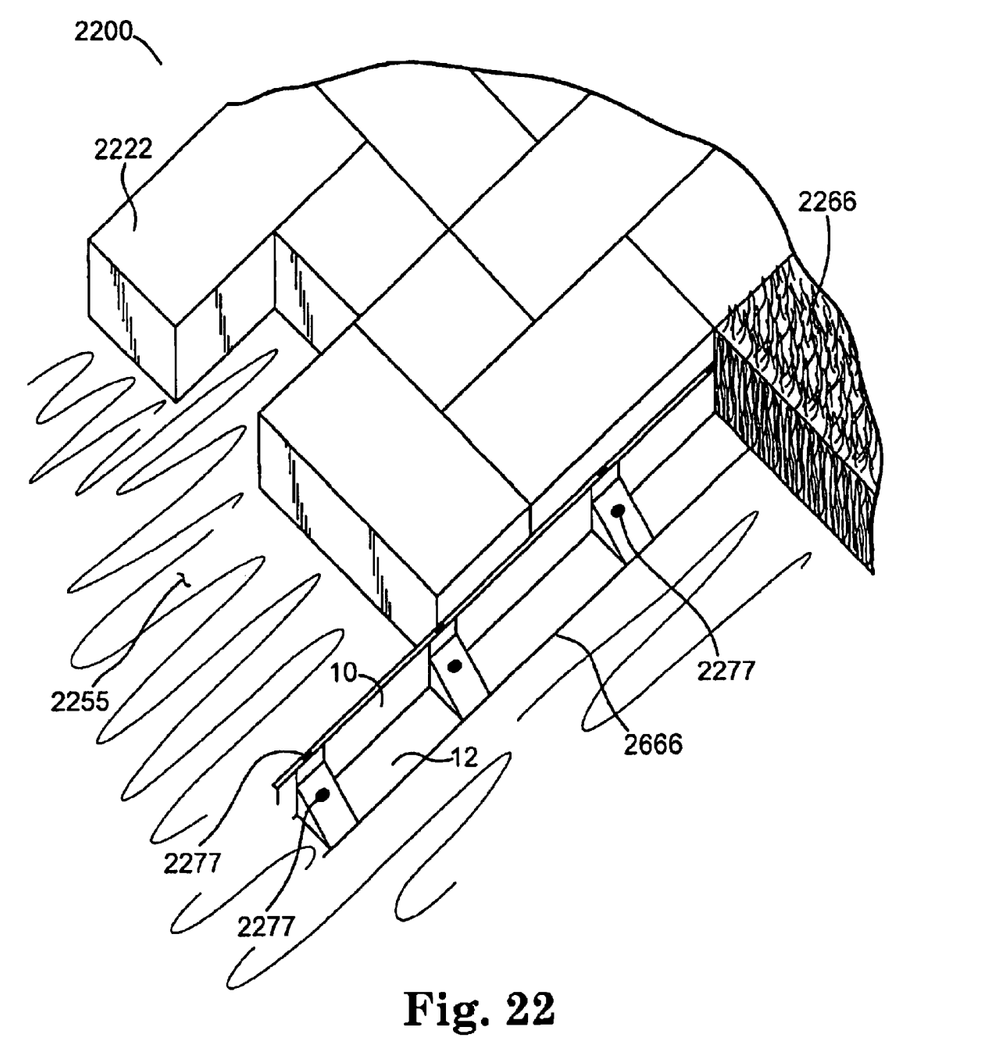
FIG. 22 is a perspective view of a prepared base surface and a plurality of paving stones arranged over the prepared base surface within a predetermined boundary.

FIG. 22 is a perspective view 2200 of a prepared base surface 2255 and a plurality of paving stones 2222 arranged over the prepared base surface 2255 within a predetermined boundary formed by the edge restraint 2666 and turf 2266. The edge restraint 2666 is shown having an upper section 10 and a base section 12. The upper section 10 resides adjacent the edges of the plurality of paving stones 2222 and the base section lies atop the prepared base surface 2255 securing the paving stones 2222 within the predetermined boundary formed by turf 2266.

Therefore, FIG. 22 discloses a paving stone installation including a prepared base surface 2255 and a plurality of paving stones 2222 arranged over the prepared base surface 2255 within a predetermined boundary shown in the figure. The paving stone installation also discloses an edge restraint system arranged along at least a portion of the predetermined boundary. The system includes at least one edge restraint section having a longitudinal length. The section may also include a substantially upright wall section 10 having a first surface facing the paving stones 2222 and a base section 12 extending from a lower end of the upright wall section 10 forming a bracing system. The bracing system may define a plurality of openings 2277 along the longitudinal length thereof. The edge restraint section may include a connector arranged at a longitudinal end configured to overlap at least part of a surface of one of said openings to connect the edge restraint section to another edge restraint section.

The instant invention facilitates assembly in the field where one edge restraint section is already installed, since the overlapping connector of the instant invention allows easy installation of another edge restraint section thereto. Therefore, existing edge restraints can easily be modified at a later time, and jobs can be easily restarted after interruptions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An edge restraint system, comprising:
   a first edge restraint and bracing section having a longitudinal length and including a connector arranged at one end of said edge restraint section; and
   a second edge restraint section including a substantially upright wall;
   said bracing system extending away from one side of said upright wall, said bracing system defining a plurality of openings along the longitudinal length of the first edge restraint section, the longitudinal length of the second edge restraint section being variably configurable such that one of said plurality of openings is maintained at a longitudinal end of said first edge restraint section;

wherein said connector comprises at least one portion of the bracing system which overlaps a top surface of said one opening of said first edge restraint section.

2. The edge restraint system according to claim 1, wherein said plurality of openings in the bracing system each include thin-walled portions to facilitate insertion of a spike.

3. An edge restraint section, comprising:
a substantially upright section;
a base section extending from a lower end of said upright section; and
a plurality of engagement elements extending from said base section; and
a connector located at a longitudinal end of said base section, said connector configured to overlap at least part of a top surface of any one of a plurality of engagement elements arranged at a longitudinal end of another edge restraint section, and wherein said connector comprises an upper wall extending laterally from said longitudinal end and an inner lateral wall extending downward from an inner lateral edge of the upper wall, the upper wall defining a connector opening, and an aperture for receiving spike capable of extending though both said connector opening and said one engagement elements of another edge restraint section secure the edge restraint sections in a longitudinal direction.

4. An edge restraint system for placement on a surface and for maintaining a predetermined boundary, comprising:
at least first and second edge restraint section, each of which having a longitudinal length, each section further comprising a substantially upright wall having a first surface facing toward the boundary,
a base section extending from the upright wall and a bracing system extending from a surface of said base section, said bracing system defining at least one opening along its longitudinal length thereof; wherein one of said edge restraint sections includes a connector arranged at a longitudinal end and being configured to overlap at least part of a top surface of any one of said openings configured to be at a longitudinal end of another edge restraint section.

5. An edge restraint system for placement on a surface and for maintaining a predetermined boundary, comprising:
at least first and second edge restraint sections, each of which having a longitudinal dimension and first and second ends, each section having a substantially upright wall,
a base section extending from the upright wall;
a brace, on at least said first restraint section, said brace extending away from said base section;
an engagement portion on at least said second restraint section, said engagement portion being configured to at least partially envelop said brace in substantially rigid engagement therewith; whereby said first and second restraint sections are maintained substantially immobilized with respect to each other at their point of engagement.

6. The edge restraint according to claim 5, wherein said bracing system includes at least one aperture, and wherein said engagement portion includes an aperture positioned to be in co-axial alignment with said brace aperture said sections are engaged, so that a fixation device may be inserted through said aligned apertures to further immobilize said sections.

7. The edge restraint according to claim 6, wherein a portion of said brace and said engagement portion are each sized to nest said brace portion within said engagement portion when said sections are engaged.

8. The edge restraint according to claim 7, wherein said brace includes a protrusion and wherein said engagement portion includes a receptacle sized to engage said protrusion in a nesting relationship to immobilize relative movement of said receptacle and protrusion when engaged.

9. An edge restraint section, comprising:
a substantially upright section;
a base section extending from a lower end of said upright section; and
a plurality of braces extending from said base section; and
a connector located at a longitudinal end of said base section, said connector configured to be in nested engagement with at least part of a top surface of any one of a plurality of braces arranged at a longitudinal end of another edge restraint section, so that adjacent edge restraint sections are immobilized from moving apart from each other, and
wherein each of said braces defines a brace opening for receiving a fastener, and wherein said connector defines a connector opening for receiving said fastener, said connector opening being aligned with said brace opening of said one of the braces of another one of the edge restraints, said connector including an upper wall extending laterally from said longitudinal end, said upper wall defining a connector opening for receiving a spike; and
wherein said connector further comprises at least one of:
(a) an inner lateral wall extending downward from said base section;
(b) an outer lateral wall extending downward from said base section; and
(c) a rear wall extending downward from a rear edge of said base section.

10. An edge restraint section, comprising:
a substantially upright section;
a base section extending from a lower end of said upright section; and
a plurality of braces extending from said base section; and
a connector located at a longitudinal end of said upright and base sections, said connector configured to be in nested engagement with at least part of a top surface of any one of a plurality of braces arranged at a longitudinal end of another edge restraint section, so that adjacent edge restraint sections are immobilized from moving apart from each other, and
wherein said connector comprises an upper wall extending laterally from a longitudinal end of the edge restraint section and an outer lateral wall extending downward from an outer lateral edge of said upper wall, the overlapping connection with the brace of another edge restraint section securing the edge restraint sections in a longitudinal direction.

11. An edge restraint section, comprising:
a substantially upright section;
a base section extending from a lower end of said upright section; and
a plurality of braces extending from said base section; and
a connector located at a longitudinal end of said upright and base sections, said connector configured to overlap at least part of a top surface of any one of a plurality of braces arranged at a longitudinal end of another edge restraint section, and wherein said connector comprises an upper wall extending laterally from said longitudinal end and an inner lateral wall extending downward from an inner lateral edge of the upper wall, the upper wall defining a connector opening, and a fastener extending through both said connector opening and said one brace of another edge restraint section secure the edge restraint sections in a longitudinal direction.

* * * * *